US009215280B2

(12) United States Patent
Veeramani et al.

(10) Patent No.: US 9,215,280 B2
(45) Date of Patent: Dec. 15, 2015

(54) SYSTEMS AND METHODS FOR DOWNLOADING MULTIPLE FILES

(71) Applicant: Unisys Corporation, Blue Bell, PA (US)

(72) Inventors: Saravanan Veeramani, Bangalore (IN); Sahana Neeralike, Bangalore (IN)

(73) Assignee: Unisys Corporation, Blue Bell, PA (US)

( * ) Notice: Subject to any disclaimer, the term of this patent is extended or adjusted under 35 U.S.C. 154(b) by 112 days.

(21) Appl. No.: 13/799,183

(22) Filed: Mar. 13, 2013

(65) Prior Publication Data

US 2014/0280696 A1 Sep. 18, 2014

(51) Int. Cl.
*H04L 29/08* (2006.01)
(52) U.S. Cl.
CPC ............ *H04L 67/1097* (2013.01); *H04L 67/06* (2013.01)
(58) Field of Classification Search
CPC ....................................................... H04L 67/10
USPC ............................ 709/217; 711/162; 707/827
See application file for complete search history.

(56) References Cited

U.S. PATENT DOCUMENTS

| 8,639,781 | B1* | 1/2014 | Motes | H04L 67/02 455/414.1 |
|---|---|---|---|---|
| 2002/0188942 | A1* | 12/2002 | Bryan et al. | 717/176 |
| 2012/0110515 | A1* | 5/2012 | Abramoff et al. | 715/854 |
| 2013/0254401 | A1* | 9/2013 | Marshall | H04L 47/70 709/226 |

OTHER PUBLICATIONS

"Upload Files and Create Download Buttons"—Go Daddy, Jul. 2011 https://www.godaddy.com/help/upload-files-and-create-download-buttons-8473.*

* cited by examiner

*Primary Examiner* — Randy Scott
(74) *Attorney, Agent, or Firm* — Robert P. Marley (57) ABSTRACT

In a system and method to allow a user to download multiple files in a SharePoint environment, the system includes a detection module configured to detect a selection of at least one item from a document library by a user. The item can be one or more of a file or folder including groups of files. The system further includes a packaging module configured to package the at least one item as a zip file. Furthermore, the system includes a downloading module configured to download the zip file.

12 Claims, 8 Drawing Sheets

SYSTEMS AND METHODS FOR DOWNLOADING MULTIPLE FILES

TECHNICAL FIELD

The presently disclosed embodiments deal generally with the field of document management, and more specifically with downloading multiple files or folders as a zip file.

BACKGROUND

Microsoft SharePoint is a central web application platform associated with document management and web content management systems for various enterprise requirements. Microsoft SharePoint was first released in year 2001, and the latest version was released in 2010 as SharePoint 2010. People can manage files and set up their web sites for sharing with others using the SharePoint. Typically, a SharePoint Site is a collection of pages, lists, and libraries configured to achieve an objective. Sites have the ability to be configured or customized in a number of ways. SharePoint provides a central location to put content such as files or folders. The content can be accessed and modified within a web browser or using a client application on a desktop or smartphone. The content is stored in libraries and lists in the SharePoint 2010 environment. The libraries include a number of files or folders which users can browse and download depending on the access permissions. Different types of libraries exist in the SharePoint 2010 such as picture library, documents library, forms library, report library, etc.

SharePoint 2010 allows users to download only a single file at a time and does not allow the user to download multiple files simultaneously. Therefore, downloading multiple files in the SharePoint 2010 is a time consuming process.

SUMMARY

The present disclosure describes a system to facilitate a user to download multiple files in a SharePoint environment and primarily in SharePoint 2010. The system includes a detection module configured to detect a selection of at least one item from a document library by a user. The item can be one or more file or folder which in turn can include one or more files or sub-folders. The system also includes a download button configured to be activated on selection of the at least one item. The system further includes a packaging module configured to package the at least one item as a zip file based on the selection of the download button by the user. Furthermore, the system includes a downloading module configured to download the zip file.

Another aspect of the present disclosure provides a computer implemented method to allow a user to download multiple files in a SharePoint environment. The method includes detecting a selection, by a user, of at least one item from a document library. The at least one item can be one or more files or folders including one or more files or sub-folders. The method also includes activating a download button on selection of the at least one item. The method further includes packaging the at least one item as a zip file based on the selection of the download button by the user. Finally, the method includes downloading the zip file.

Another aspect of the present disclosure provides a computer program product embodied on a computer readable medium having instructions to perform business center operations. The computer program product performs the steps of detecting a selection of at least one item from a document library by a user, wherein the at least one item is at least one of a file or folder including a sub-folder; activating a download button on selection of the at least one item: packaging the at least one item as a zip file based on the selection of the download button by the user, and downloading the zip file.

BRIEF DESCRIPTION OF THE DRAWINGS

The figures described below and attached hereto set out and illustrate a number of exemplary embodiments of the disclosure. Throughout the figures, like reference numerals refer to identical or functionally similar elements. The figures are illustrative in nature and are not drawn to scale.

DETAILED DESCRIPTION

The following detailed description is made with reference to the figures. Embodiments are described to illustrate the claimed invention, not to limit its scope, which is defined by the claims. Those of ordinary skill in the art will recognize a variety of equivalent variations on the description that follows.

Overview

The present disclosure describes systems and methods that allow a user to download multiple files in a SharePoint environment. The system detects a selection of at least one item from a document library. The item can be a file or a folder. A person skilled in the art will appreciate that the files or groups of files, e.g., folders are limited to document files and do not include other content such as picture files or links. The system has a download button that gets activated when the user has selected at least one item. A packaging module of the system packages the selected item(s) as a zip file when the user selects the download button. The packaging module also creates folders in the zip file corresponding to the selected folders. Thereafter, a downloading module downloads the zip file.

The disclosed system and method allows a user to select multiple files in a Microsoft SharePoint environment and download them as a single zip file. The disclosed system and method also allows the user to select the whole document set, e.g., in the form of a folder, along with its files as a zip file.

It should be noted that the description below does not set out specific details of manufacture or design of the various components. Those of skill in the art are familiar with such details, and unless departures from those techniques are set out, techniques and designs known in the art should be employed, and those in the art are capable of choosing suitable manufacturing and design details.

Definitions

Document Set—Document set allows users to group multiple documents that support a single project or task, together into a single entity. All documents or files in a Document Set share the metadata and the entire set can be versioned.

Description Of Embodiments

Figure 1:
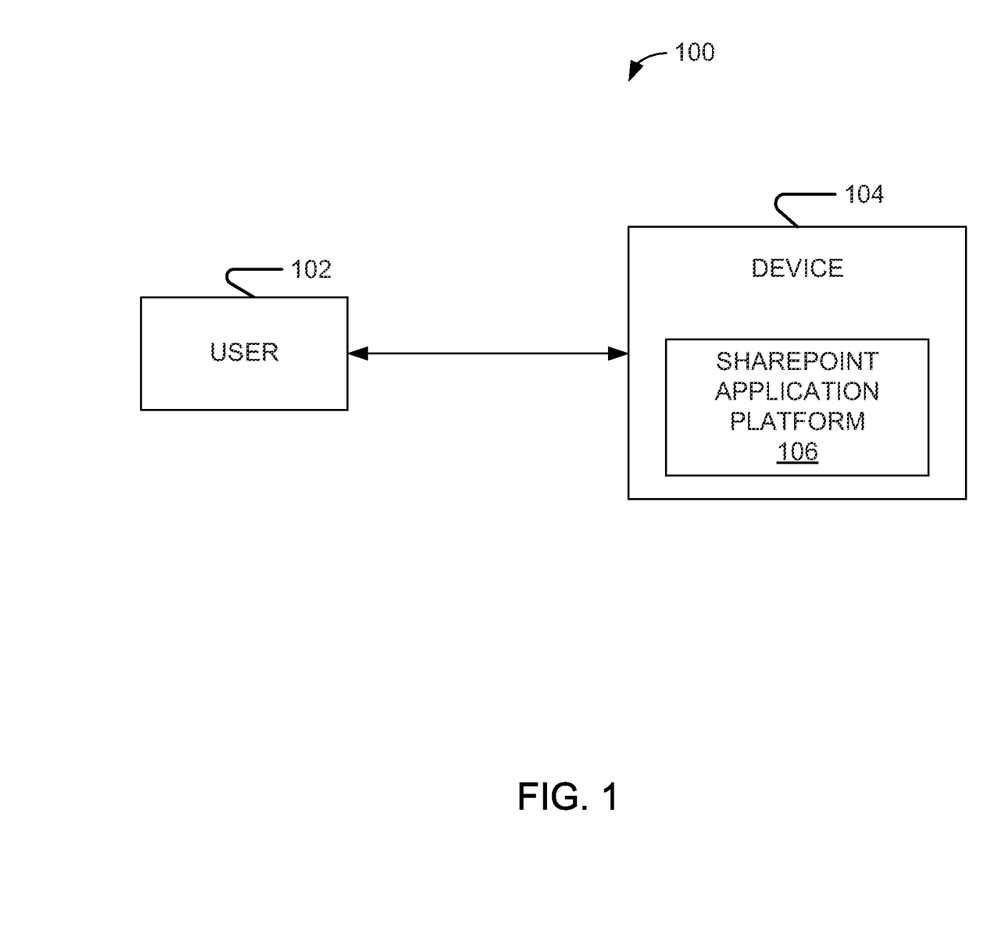
FIG. 1 illustrates an environment where various embodiments of the present disclosure can function.

FIG. 1 illustrates an environment, where various embodiments of the present disclosure may function. A user 102 can access one or more files on the device 104. The device 104 can be any device capable of web communication such as computer, laptop, smart phone, and so forth. The device 104 includes an application platform with Microsoft SharePoint 106 running on it. The device can be a computer, laptop, smartphone, and the like. SharePoint is a web application platform developed by Microsoft that was first launched in 2001 and for which the latest version was released in 2010 and is usually referred as SharePoint 2010. The SharePoint application platform 106 (hereinafter referred as SharePoint 106) allows the user 102 to manage web content and other files. The user can use the SharePoint 106 to store, access, and track electronic files or images of paper documents. None of the SharePoint version allows the user 102 to download multiple files as a single zip file. Therefore, to download multiple files, the user 102 has to download each file separately, which in turn results in more time consumption.

The present disclosure provides a solution for these problems of the existing SharePoint versions by disclosing systems and methods to allow the user 102 to select and download multiple files as a single zip file. The system also allows the users to download a complete document set long with its folders and sub-folders. The disclosed system can be installed and implemented in the existing SharePoint environment and on all versions of SharePoint.

Figure 2:
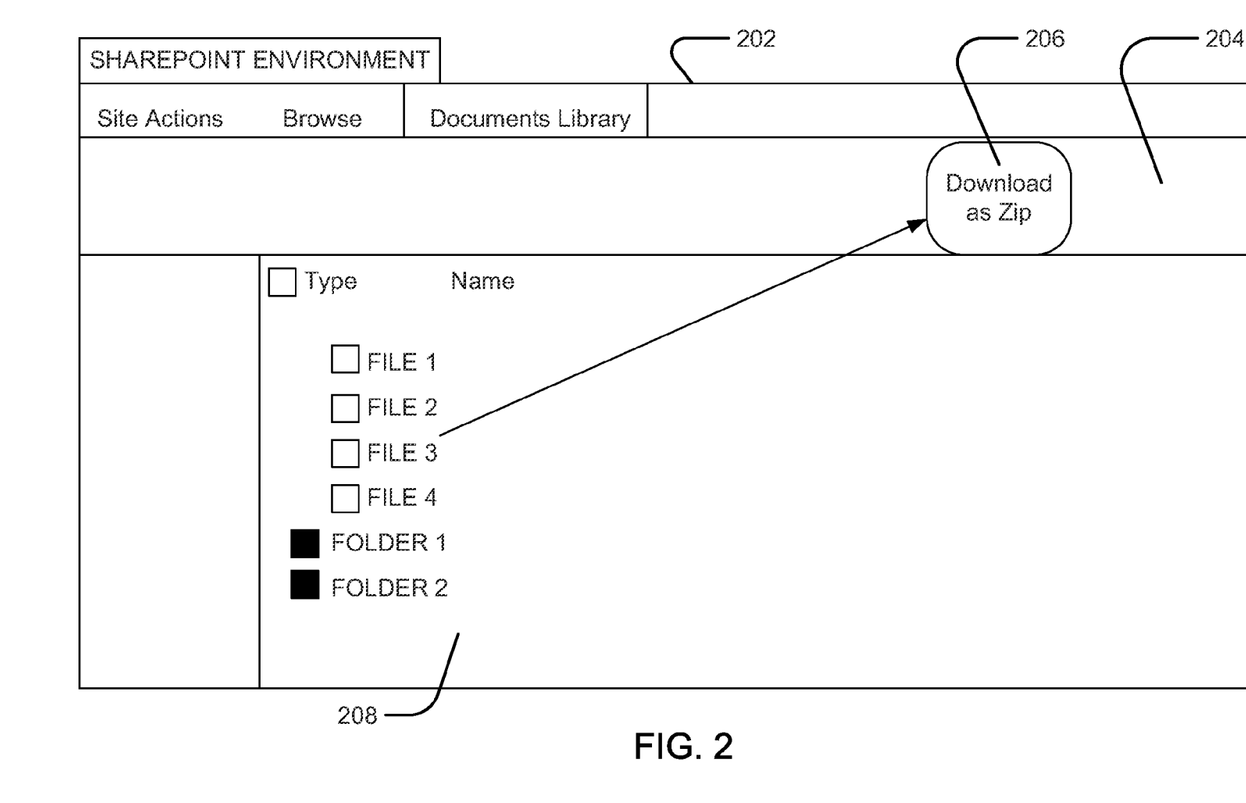
FIG. 2 illustrates an exemplary SharePoint user interface (UI) on a device, in accordance with an embodiment of the present disclosure.

FIG. 2 illustrates an exemplary SharePoint user interface (UI) 202 on a device, in accordance with an embodiment of the present disclosure. As discussed with reference to FIG. 1, the device 104 includes the SharePoint application platform 106 installed on it. The SharePoint platform 106 may be used to share and access content such as files and folder(s) by the users. The user 102 can access one or more files through the UI 202. The UI 202 includes one or more tabs or ribbons such as a document library ribbon 204 having one or more options or buttons. A customized action button i.e. a Download as Zip button 206 is available on the document library ribbon 204. Here, the Download as Zip Button 206 is present inside the copies group on the document library ribbon 204. The user 102 can select one or more items from a list of items 208 in the document library in the SharePoint application platform 106. The items can be files or folders including sub-folders. Each of the items has an associated unique item identity (ID). The user 102 can select individual files, folders, or a combination of these for downloading. A person skilled in the art will appreciate that the files or groups of files, e.g., folders are limited to document files and do not include other content such as picture files or links.

Usually the libraries including the content are stored on a SharePoint server or database. The disclosed system allows the user 102 to download multiple files, detects a selection of one or more items from a document library, and activates a Download as Zip button 206. The user 102 selects this button to initiate the downloading process. Thereafter, the system packages the multiple files into one zip file and downloads it onto the browser of the device 104. The user 102 can access SharePoint sites using the browser and can download multiple files on his/her browser.

The user 102 can also download a complete document set including all its folders as a zip file. The user 102 can select a complete document set or folder such as folder 1 from the list of folders as shown. Then the system activates the Download as Zip button 206 on the document library ribbon 204. Thereafter, the system packages all the files and folders or sub-folders in a zip file. The system also creates folders and sub-folders in the zip file.

Figure 3:
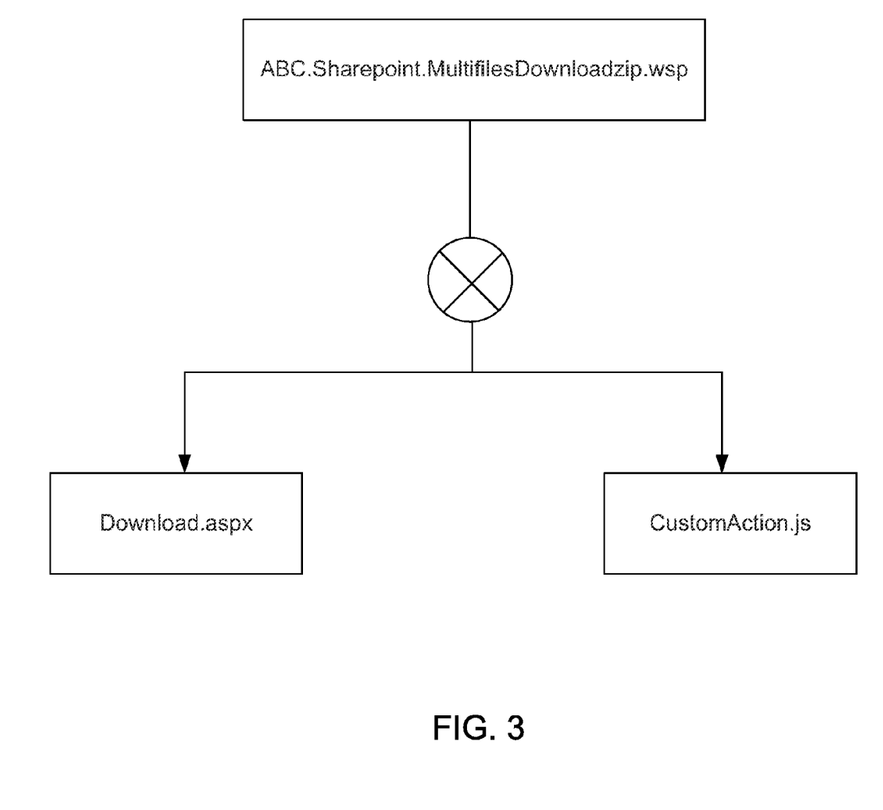
FIG. 3 illustrates a exemplary deployment diagram of the disclosed system, in accordance with an embodiment of the present disclosure.

FIG. 3 illustrates an exemplary deployment diagram of the disclosed system, in accordance with an embodiment of the present disclosure. The system or the solution disclosed in the present disclosure can be deployed using the "ABC.SharePoint.MultifilesDownload.wsp" 302 solution containing two files:—a "Download.aspx" 306 and a "CustomAction.js" 308. To deploy these two files, they should be located at "C:\Program files\Common Files\Microsoft Shared\Web Server Extensions\14\TEMPLATE\CONTROLTEMPLATES". The steps to deploy the disclosed solution or system in the SharePoint application platform 106 are as follows:

Step1: stsadm -o retractsolution -name "ABC.SharePoint.MultiFilesDownloadZip.wsp" -immediate Step2: stsadm -o execadmsvcjobs Step3—stsadm -o deletesolution -name "ABC.SharePoint.MultifilesDownloadZip.wsp"

Step4: add the new wsp into 14 hive bin folder

Step5: stsadm -o addsolution -filename "ABC.SharePoint.MultiFilesDownloadZip.wsp"

Step6: stsadm -o deploysolution -name "ABC.SharePoint.MultifilesDownloadZip.wsp" -immediate -allowgacdeployment -force Step7: stsadm -o execadmsvcjobs Step8: iisreset A person skilled in the art will appreciate that the steps of deploying the system may differ and may include more or less steps depending on the technical configuration of the device 104 or the SharePoint platform 106. The system can be installed into existing SharePoint 2010 running on the device 104. In one embodiment, the system can be installed as a plugin, so that the user can enable or disable it on the device 104 based on the requirement. In one embodiment, the system can be installed on each device 104 or on a shared device in the web or network only. The services of the system can be accessed from the shared device through the Internet, local area network (LAN), wide area network (WAN), and so forth.

Figure 4:
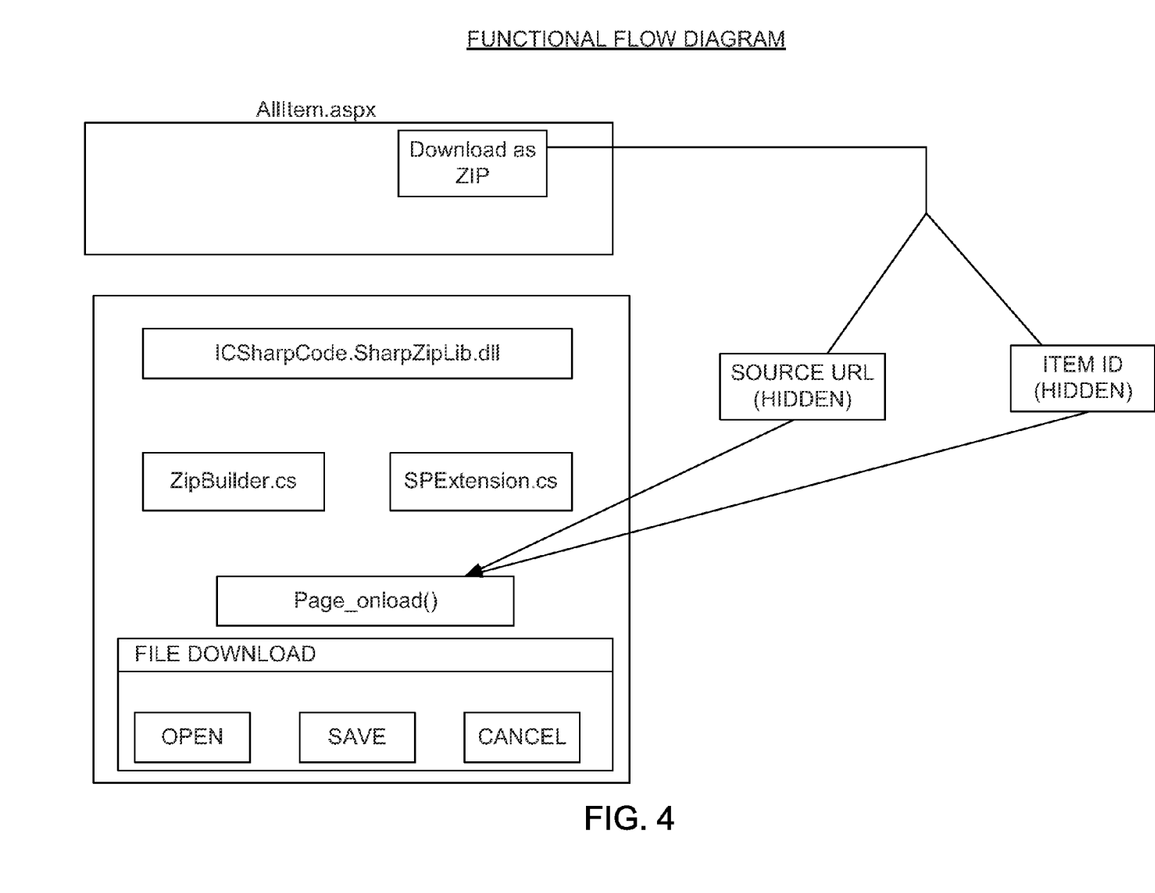
FIG. 4 illustrates an exemplary functional flow diagram of the disclosed system facilitating downloading of multiple files as a single zip file.

FIG. 4 illustrates an exemplary functional flow diagram of the disclosed system, facilitating downloading of multiple files as a single zip file. As discussed with reference to FIG. 1, the user 102 can use the SharePoint Application platform 106 running on the device 104 to access or download at least one file or folder. When the user 102 selects multiple items or files including a document set in a folder, the Download as Zip button 206 as shown in FIG. 2 is activated. A post request from client is sent to "Download.aspx page" and this page will take care of packing up a zip file and downloading to a browser on the device 104. The "Download.aspx page" expects two parameters—"sourceUrl" and "itemIDs". The "sourceUrl" is the full address of the document library (and of a folder, if inside a sub-folder) where the request is being made from. The "itemIDs" includes a semi-colon item whether it is a file or a folder that has an associated item identity (ID). If the item selected by the user 102 is a folder then the folder's ID is also sent in the "itemIDs" list.

The system takes the list of item IDs and for each item ID, the corresponding file from the document library and retrieves them into the SharePoint platform 106. Then, the system, by using a "ZipBuilder class", packages the files or retrieved folders as a zip file. The "ZipBuilder class" is a built in class in the java environment for creating zip files. When the selected items includes at least one folder the "ZipBuider class" builds the corresponding folders into the zip file as well and puts all the items that are in that selected folder into the corresponding zip file folder. The "ZipBuilder class" will also traverse through all the sub-folders in the hierarchy within the folder.

Figure 5:
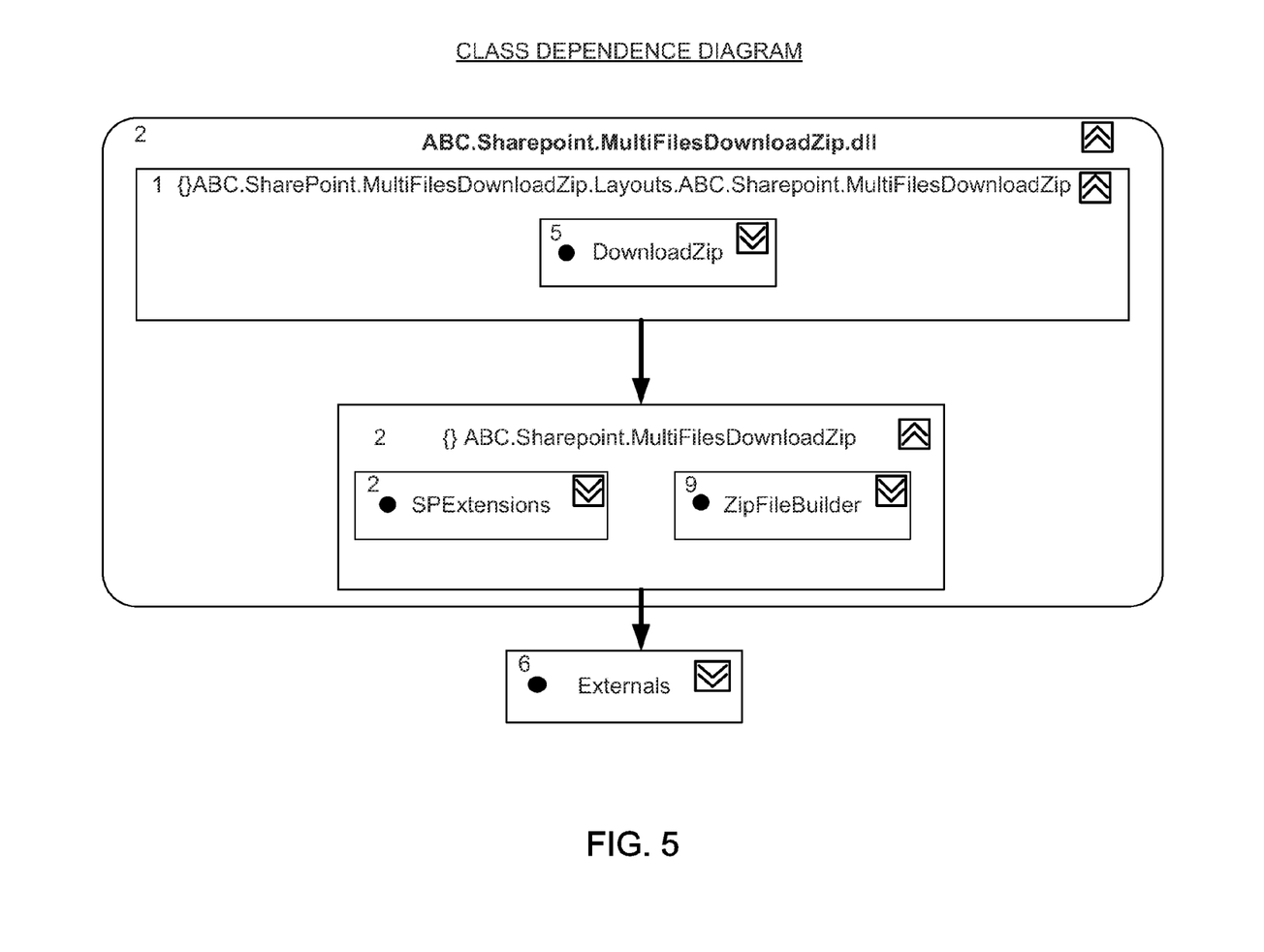
FIG. 5 illustrates a class dependence diagram of the disclosed system facilitating downloading of multiple files as a single zip file

FIG. 5 illustrates an exemplary class dependence diagram of the disclosed system, facilitating the downloading of multiple files as a single zip file. The class dependence diagram displays that the system for facilitating downloading of multiple items or files as a zip file in the SharePoint environment is implemented as a "DownloadZip" class. The "DownloadZip" class includes two classes: "SPExtensions" and "ZipFileBuilder". The "ZipFilebuilder" class is used to create a zipfile. The "SPExtensions" class is for adding extension methods to some of the "Microsoft SharePoint" objects. This class basically just adds a few simple helper methods to the "SPListItem" class and the "SPList" class. For the "SPListItem" class, it has a method to determine if the "SPListItem" instance is actually a folder and for the "SPList" class, it has a method to determine if the list is actually a document library. The "DownloadZip" class contains an "Elements.xml" file that takes care of adding the disclosed custom action as disclosed in FIG. 2. i.e. the Download as zip button 206, to the document library ribbon 204. The structure of these classes are explained in details in FIG. 6.

Figure 6:
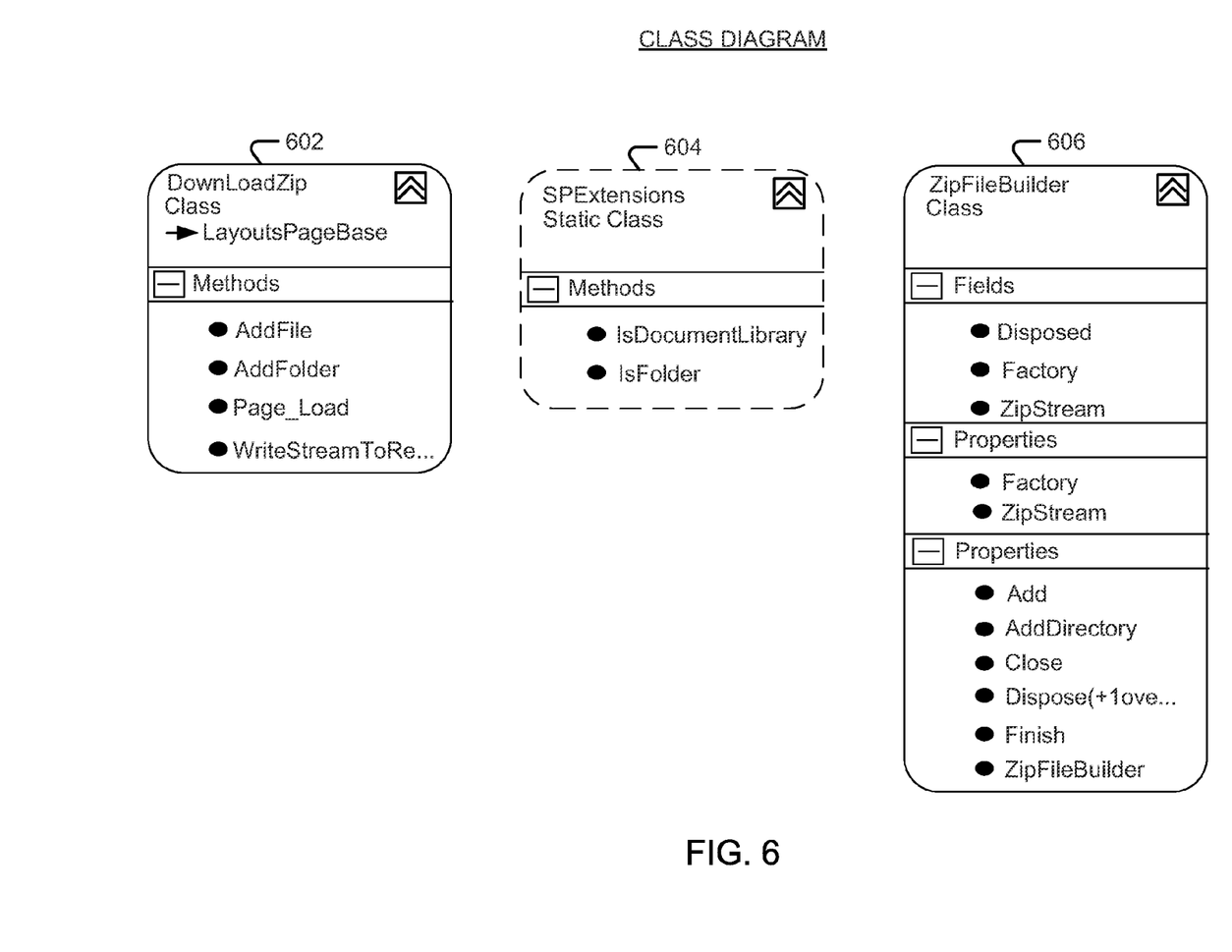
FIG. 6 illustrates an exemplary class diagram of the system for facilitating a multiple document download in the SharePoint environment.

FIG. 6 illustrates an exemplary class diagram of the system, facilitating a multiple file download in the SharePoint environment. As shown, the system is implemented using the "DownloadZip" class 602 including the "SPExtensions" static class 604 and the "ZipFileBuiler" class 606. The "DownloadZip" class 602 includes various attributes and methods such as AddFile, AddFolder, Page_Load, WriteStreamToResponse, and so forth. These methods may be called by using the SharePoint objects. The Addfile method is used to add files into "ZipBuilder" class 606 to create a zip file. The Addfolder method is used to add all the files inside a folder into "ZipBuilder" class 606 when the selected items include folder(s). The "SPExtensions" static class 604 includes at least two methods: IsDocumentLibrary and IsFolder. The IsDocumentLibrary method is for the SPList class and determines if the list is actually a document library. Similarly, the IsFolder method is for SPListItem class and determines if the SPListItem instance is actually a folder. The Add method and AddDirectory method as shown in "ZipFileBuilder" class 606 are helper methods that allow the user to add files and folders. In addition, the Add and AddDirectory methods finalize the zip file. These methods are called to make sure that the zip file is written out or created correctly.

Figure 7:
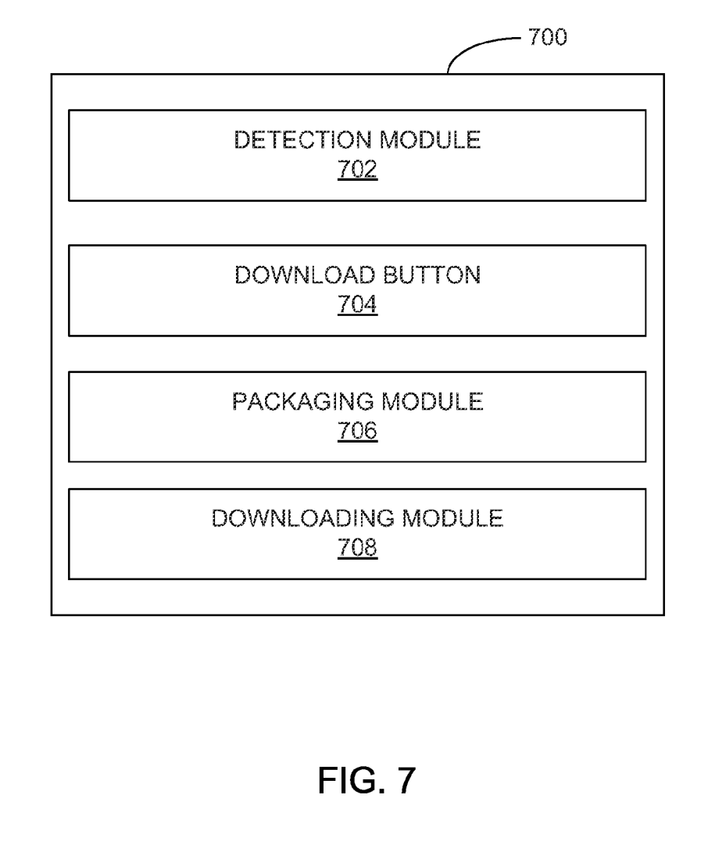
FIG. 7 illustrates exemplary system elements of the disclosed system.

FIG. 7 illustrates exemplary system elements of a system 700 facilitating a user to download multiple files as a single zip file in the SharePoint environment. The SharePoint application platform is installed on a device such as a computer, a laptop, a smartphone etc. The users can create their sites using the SharePoint to share content with others. The content is usually stored in different types of libraries and lists in the SharePoint database. The library can be a document library, picture library, report library, forms library, and so forth. The user can select and access files such as document files from these libraries. A person skilled in the art will appreciate that for purposes of this disclosure, the files or groups of files, e.g., folders are limited to document files and do not include other content such as picture files or links.

The system 700 includes a detection module 702 for detecting a selection of at least one item from a document library in the SharePoint Environment. The user can select multiple items such as a file or a folder from a list of items in the library. Each of the items has an associated unique item Identity (ID). After detecting the selection of multiple items by the user, a download button 704 of the system 700 is activated. In one embodiment, the download button 704 is a download as zip button on a document library ribbon of the SharePoint interface. The system also includes a packaging module 706 for packaging the selected items into a zip file. The packaging module 706 is configured to retrieve one or more items corresponding to the selected items based on their item IDs from the SharePoint database or server. Then, all the retrieved items are packaged into a single zip file. When the selected items includes one or more folders, all files and sub-folders of the selected folder are also retrieved and packaged in the respective folders and sub-folders in the zip file. The packaging module 706 packages only documents excluding the links or Uniform Resource Locator (URL) to the files in the zip file. The system 700 further includes a downloading module 708 for downloading the zip file at the user's device or browser. The downloading module 708 will download the files as zip file but it will not download the links to these files or folders.

The system 700 can download a complete document set including multiple folders or files as a single zip file. The system 700 can support any level of SharePoint site's library. The system 700 even allows the user to download files within a folder or a document set within a folder etc., but not links to the file(s). The system 700 supports downloading of files from all kinds of libraries, including document panel and "allitems.aspx" page except the picture library and report library. The "allitems.aspx" is an built-in page in any library. The system 700 does not support downloading of items including list or survey other than the document library. As discussed with reference to FIG. 3, the system 700 can be installed into existing SharePoint 2010. In one embodiment, the system 700 can be installed as a plugin, so that the user can enable or disable it on the device based on the requirement. In one embodiment, the system 700 can be installed on each machine or device or on a standalone machine in the web or network only. The services of the system 700 can be accessed from the standalone machine in the network through the Internet or local area network (LAN).

Figure 8:
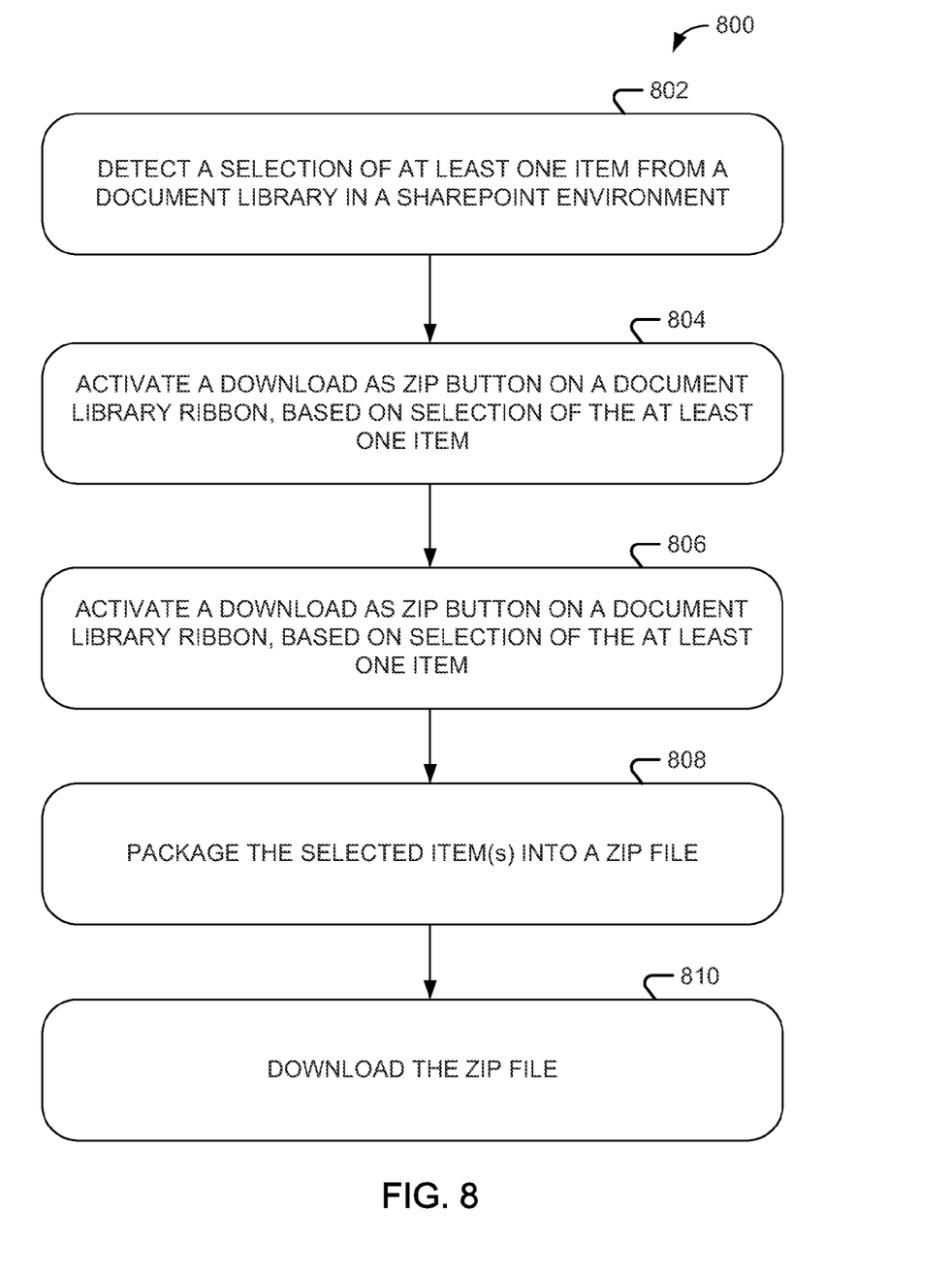
FIG. 8 is a flowchart illustrating a method to allow a user to download multiple files in the SharePoint environment.

FIG. 8 is a flowchart illustrating an exemplary method 800 allowing a user to download multiple files in the SharePoint environment. As discussed with reference to FIG. 1, the user 102 can access content through the SharePoint application platform 106 on the device 104. The device can be a computer, a laptop, a tablet computer, a smartphone, etc. The user 102 selects and downloads multiple files using the SharePoint platform 106 on the device 104. As described in FIG. 7, the system facilitating the downloading of multiple files as a single file includes a detection module, a download button 704, a packaging module 706, and a downloading module 708.

At step 802, the detection module 702 detects a selection of at least one item from a document library in a SharePoint environment or application platform. Based on the selection of one or more items by the user 102 the download button 704 (download as zip button) is activated at step 804. The user 102 then selects or clicks the download button 704 at step 806 to initiate downloading process. At step 808, a packaging module 706 packages the selected items into a zip file. The packaging module 706 is configured to retrieve the files or items corresponding to the item IDs of the selected items from the SharePoint server or database. Thereafter, the packaging module 706 packages the retrieved files or folders into a zip file. The packaging module 706 does not include links or URLs to these files or items in the zip file. At step 810, a downloading module 708 downloads the zip file at the user's device 104 or browser at the device 104.

The disclosed system and method allows a user to download multiple files in a highly compressed form. A person skilled in the art will appreciate that the files or groups of files, e.g., folders are limited to document files and do not include other content such as picture files or links.

Those skilled in the art will appreciate that the embodiments of the disclosure may be practiced on any machine in a large enterprise environment and further on other computer system configurations including, without limitation, handheld devices, multiprocessor systems, and similar systems having interfaces, such as an application programming interface (API), facilitating interaction between users and computer systems.

The specification has set out a number of specific exemplary embodiments, but persons of skill in the art will understand that variations in these embodiments will naturally occur in the course of embodying the subject matter of the disclosure in specific implementations and environments. It will further be understood that such variations and others, fall within the scope of the disclosure. Neither those possible variations nor the specific examples set out above are set out to limit the scope of the disclosure. Rather, the scope of claimed invention is defined solely by the claims set out below.

What is claimed is:

1. A system for allowing a user to download multiple files a network-based productivity information management platform, the system comprising:
   a network-based productivity information management platform server comprising a processor and a memory, wherein the processor is coupled to the memory, wherein the memory stores a set of instructions to execute on the processor, wherein the set of instructions is instructive to implement:
      a detection module configured to detect a binary choice selection of at least one item from a document library by a user, wherein the at least one item includes at least one of a file or a folder;
      a download button configured to switch from being inactive for pressing to being active for the pressing based on the detection module detecting the selection of the at least one item;
      a packaging module configured to package the at least one item as a compressed file based on the pressing of the download button by the user after the download button is activated; and
      a downloading module configured to facilitate downloading of the compressed file.

2. The system of claim 1, wherein each of the at least one item comprises an associated item identity (ID).

3. The system of claim 2, wherein the packaging module is further configured to retrieve one or more items corresponding to the associated item ID of the at least one item from the document library.

4. The system of claim 1, wherein the packaging module is configured to structure one or more folders in the compressed file based on the selection.

5. A method for allowing a user to download multiple files in a network-based productivity information management platform, the method comprising:
   detecting, by a network-based productivity information management platform computer, a binary choice selection of at least one item from a document library by a user, wherein the at least one item is at least one of a file or a folder;
   activating, by the network-based productivity information management platform computer, a download button for pressing based on the detecting, wherein the activating comprises switching the download button from being inactive for the pressing to being active for the pressing;
   packaging, by the network-based productivity information management platform computer, the at least one item as a compressed file responsive to the pressing of the download button by the user after the activating; and
   facilitating, by the network-based productivity information management platform computer, downloading of the compressed file.

6. The method of claim 5, wherein each of the at least one item comprises an associated item identity (ID).

7. The method of claim 6, wherein packaging the at least one item comprises retrieving one or more items corresponding to the associated item ID of the at least one item from the document library.

8. The method of claim 5, wherein packaging the at least one item comprises structuring one or more folders in the compressed file based on the detecting.

9. A computer program product embodied on a non-transitory computer readable medium comprising instructions to perform business center operations on a network-based productivity information management platform, wherein the computer program product configured to implement a method, wherein the method comprising:
   detecting, by a network-based productivity information management platform computer, a binary choice selection of at least one item from a document library by a user, wherein the at least one item includes at least one of a file or a folder;
   activating, by the network-based productivity information management platform computer, a download button for pressing based on the detecting, wherein the activating comprises switching the download button from being inactive for the pressing to being active for the pressing;
   packaging, by the network-based productivity information management platform computer, the at least one item as a compressed file responsive to the pressing of the download button by the user after the activating; and
   facilitating, by the network-based productivity information management platform computer, downloading the compressed file.

10. The computer program product of claim 9, wherein each of the at least one item comprises an associated item identity (ID).

11. The computer program product of claim 10, wherein packaging the at least one item comprises retrieving one or more items corresponding to the associated item ID of the at least one selected item from the document library.

12. The computer program product of claim 9, wherein packaging the at least one item comprises structuring one or more folders in the compressed file based on the detecting.

* * * * *